(12) United States Patent
Noda

(10) Patent No.: US 11,631,170 B2
(45) Date of Patent: Apr. 18, 2023

(54) DETERMINATION DEVICE, SEALING SYSTEM, ESTIMATION MODEL, GENERATION DEVICE, DETERMINATION METHOD, SEALING METHOD, AND GENERATION METHOD

(71) Applicant: Kyoto Seisakusho Co., Ltd., Kyoto (JP)

(72) Inventor: Keisuke Noda, Kyoto (JP)

(73) Assignee: KYOTO SEISAKUSHO CO., LTD., Kyoto (JP)

( * ) Notice: Subject to any disclaimer, the term of this patent is extended or adjusted under 35 U.S.C. 154(b) by 231 days.

(21) Appl. No.: 17/273,974

(22) PCT Filed: Jul. 17, 2020

(86) PCT No.: PCT/JP2020/027849
§ 371 (c)(1),
(2) Date: Mar. 5, 2021

(87) PCT Pub. No.: WO2021/070444
PCT Pub. Date: Apr. 15, 2021

(65) Prior Publication Data
US 2021/0390675 A1 Dec. 16, 2021

(30) Foreign Application Priority Data

Oct. 9, 2019 (JP) .............................. JP2019-186339

(51) Int. Cl.
*G06T 7/00* (2017.01)
*B65B 7/20* (2006.01)
(Continued)

(52) U.S. Cl.
CPC ................ *G06T 7/001* (2013.01); *B65B 7/20* (2013.01); *B65B 51/225* (2013.01); *B65B 57/00* (2013.01);
(Continued)

(58) Field of Classification Search
CPC . G06T 7/001; G06T 2207/20081; B65B 7/20; B65B 51/225; B65B 57/00; G01N 21/9054; H04N 5/247; G06N 20/00
(Continued)

(56) References Cited

U.S. PATENT DOCUMENTS

| 10,919,151 | B1* | 2/2021 | Marchese | ............ | B65G 1/1373 |
| 2018/0101944 | A1* | 4/2018 | Sakai | .................... | G01N 29/265 |
| 2018/0178313 | A1* | 6/2018 | Nakayama | ........... | G01N 29/045 |

FOREIGN PATENT DOCUMENTS

| JP | 55-11587 | 1/1980 |
| JP | 63-52048 | 3/1988 |

(Continued)

OTHER PUBLICATIONS

International Search Report (ISR) dated Oct. 6, 2020 in International (PCT) Application No. PCT/JP2020/027849.

*Primary Examiner* — Allen C Wong
(74) *Attorney, Agent, or Firm* — Wenderoth, Lind & Ponack, L.L.P.

(57) ABSTRACT

A non-transitory computer readable recording medium has an estimation model according to one aspect of the present invention recorded thereon, and the estimation model is included in a program to be executed by a computer and outputs output data estimated based on input data received. In response to receiving, as the input data, a change over time in an intensity of energy emitted from a sealing part of an object subjected to a sealing process through bonding, the estimation model estimates at least one of whether sealing of the object is good or whether the sealing of the object is defective and outputs an estimation result as the output data, the change over time being calculated based on an intensity of energy emitted at each of a first time point and a second time point that is later than the first time point.

16 Claims, 11 Drawing Sheets

(51) Int. Cl.
    *B65B 51/22*        (2006.01)
    *B65B 57/00*        (2006.01)
    *G01N 21/90*        (2006.01)
    *H04N 5/247*        (2006.01)
    *G06N 20/00*        (2019.01)

(52) U.S. Cl.
    CPC ......... *G01N 21/9054* (2013.01); *H04N 5/247* (2013.01); *G06N 20/00* (2019.01); *G06T 2207/20081* (2013.01)

(58) Field of Classification Search
    USPC .......................................................... 348/92
    See application file for complete search history.

(56) References Cited

FOREIGN PATENT DOCUMENTS

| | | |
|---|---|---|
| JP | 10-288590 | 10/1998 |
| JP | 3275770 | 4/2002 |
| JP | 2003-344330 | 12/2003 |
| JP | 2004-20243 | 1/2004 |
| JP | 2005-345313 | 12/2005 |

\* cited by examiner

DETERMINATION DEVICE, SEALING SYSTEM, ESTIMATION MODEL, GENERATION DEVICE, DETERMINATION METHOD, SEALING METHOD, AND GENERATION METHOD

TECHNICAL FIELD

The present invention relates to a determination device that determines the quality of sealing, an estimation model to be used in the determination, a generation device for the estimation model, and a sealing system that includes the determination device, as well as a determination method, a generation method, and a sealing method to be implemented in each of the devices and so on.

BACKGROUND ART

In one sealing method known to date, an adhesive molten by heat is used to form a package for encasing. In such a sealing method, an adhesion portion bonded by an adhesive (i.e., adhesively bonded) retains the heat energy used to melt the adhesive for a predefined time, and thus the presence and the area of the adhesive can be detected from a thermal image. There is known a device that determines the quality of the bonding condition at an adhesion portion by detecting the presence and the area of the adhesive from a thermal image as described above (Patent Literature 1).

CITATION LIST

Patent Literature

[PTL 1]
Japanese Unexamined Patent Application Publication No. 2004-020243

SUMMARY OF INVENTION

Technical Problem

Despite the above, the device disclosed in Patent Literature 1 may fail to determine the quality of bonding accurately.

Accordingly, the present invention provides, for example but not limited to, a determination device that is capable of determining the quality of bonding more accurately.

Solution to Problem

To solve the problem described above, a determination device according to one aspect of the present invention includes: an imager that captures an image of an object subjected to a sealing process through bonding, and acquires a distribution of an intensity of energy emitted from a sealing part formed as a result of the sealing process; and a determiner that calculates a change over time in the intensity of the energy emitted from the sealing part based on a first distribution and a second distribution, the first distribution indicating the distribution acquired from an image captured by the imager at a first time point, the second distribution indicating the distribution acquired from an image captured by the imager at a second time point that is later than the first time point, and determines at least one of whether sealing is good or whether the sealing is defective based on the change over time calculated.

A determination device according to one aspect of the present invention includes: an imager that captures an image of an object subjected to a sealing process through adhesive bonding by use of an adhesive, and acquires a distribution of an intensity of energy emitted from the adhesive in a sealing part formed as a result of the sealing process; and a determiner that calculates a change over time in the intensity of the energy emitted from the adhesive based on a first distribution and a second distribution, the first distribution indicating the distribution acquired from an image captured by the imager at a first time point, the second distribution indicating the distribution acquired from an image captured by the imager at a second time point that is later than the first time point, and determines at least one of whether sealing is good or whether the sealing is defective based on the change over time calculated.

A sealing system according to one aspect of the present invention includes: a sealing device that forms an object by sealing a material to be sealed through bonding; and the determination device described above.

An estimation model according to one aspect of the present invention is an estimation model that is included in a program to be executed by a computer and that outputs output data estimated based on input data received, and the estimation model, in response to receiving, as the input data, a change over time in an intensity of energy emitted from a sealing part of an object subjected to a sealing process through bonding, estimates at least one of whether sealing of the object is good or whether the sealing of the object is defective and outputs an estimation result as the output data, the change over time being calculated based on an intensity of energy emitted at each of a first time point and a second time point that is later than the first time point.

A generation device according to one aspect of the present invention is a generation device that generates an estimation model for estimating at least one of whether sealing of an object is good or whether the sealing of the object is defective based on an intensity of energy emitted from a sealing part of the object subjected to a sealing process through bonding, and the generation device includes: a first acquirer that acquires a change over time in the intensity of the energy emitted from the sealing part based on the intensity of the energy emitted from the sealing part at each of a first time point and a second time point that is later than the first time point; a second acquirer that acquires a result of determination as to at least one of whether the sealing of the object is good or whether the sealing of the object is defective; and a generator that generates the estimation model through machine learning by using, as training data, the change over time acquired by the first acquirer and the determination result acquired by the second acquirer.

A determination method according to one aspect of the present invention includes: capturing an image of an object subjected to a sealing process through bonding, and acquiring a distribution of an intensity of energy emitted from the sealing part; calculating a change over time in the intensity of the energy emitted from the sealing part based on a first distribution and a second distribution, the first distribution indicating the distribution acquired from an image captured at a first time point in the capturing, the second distribution indicating the distribution acquired from an image captured at a second time point that is later than the first time point in the capturing; and determining at least one of whether sealing of the object is good or whether the sealing of the object is defective based on the change over time calculated.

A sealing method according to one aspect of the present invention includes: forming an object by sealing a material to be sealed through bonding; and determining at least one of whether sealing is good or whether the sealing is defective through the determination method described above.

A generation method according to one aspect of the present invention is a generation method of generating an estimation model for estimating at least one of whether sealing of an object is good or whether the sealing of the object is defective based on an intensity of energy emitted from a sealing part of the object subjected to a sealing process through bonding, and the generation method includes: acquiring a change over time in the intensity of the energy emitted from the sealing part, the change over time being calculated based on the intensity of the energy emitted from the sealing part at each of a first time point and a second time point that is later than the first time point; acquiring a result of determination as to at least one of whether the sealing of the object is good or whether the sealing of the object is defective; and generating the estimation model through machine learning by using, as training data, the change over time acquired in the intensity of the energy emitted from the sealing part and the determination result acquired as to at least one of whether the sealing of the object is good or whether the sealing of the object is defective.

Advantageous Effects of Invention

The present invention makes it possible to determine the quality of bonding more accurately.

DESCRIPTION OF EMBODIMENTS

Figure 1:
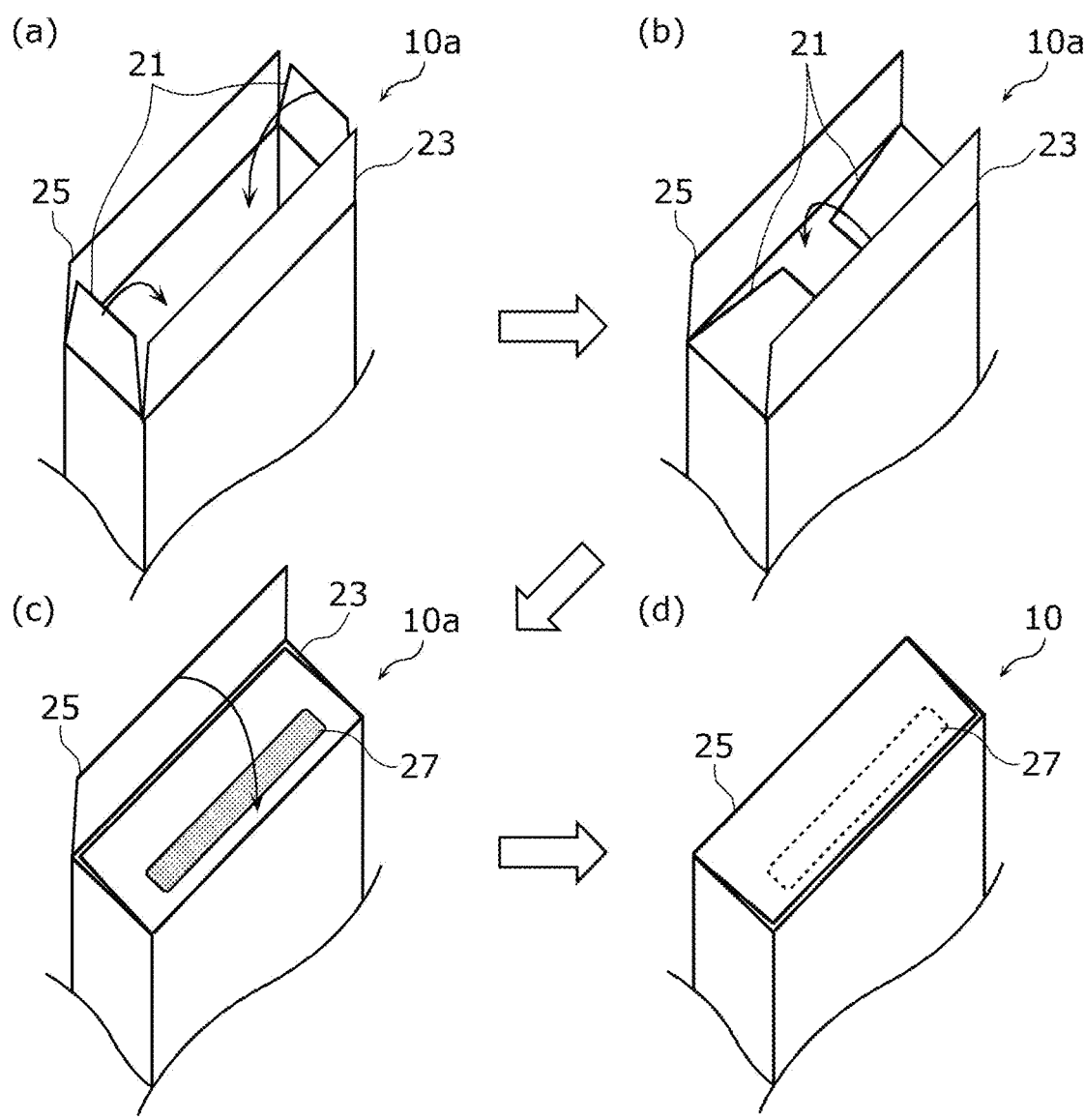
FIG. 1 is a first diagram for describing a process of forming an object according to an embodiment.

Underlying Knowledge Forming Basis of the Present Invention

When forming a package, such as an exterior box, a known sealing device seals the package by applying an adhesive molten by heat to a predetermined part of the package and by gluing this predetermined part to its corresponding part (each part is also referred to below as an "adhesion part") with the adhesive. In the case of such a sealing device, the adhesive molten by heat hardens as it cools, and the two adhesion parts are glued to each other to achieve sealing. In this process, the adhesion portion where the package is glued by the adhesive (this portion is also referred to below as a sealing part or a sealing portion) retains the heat used to melt the adhesive for a predefined time. Therefore, the presence and the area of the applied adhesive can be detected with ease by acquiring a thermal image of the package immediately after the adhesion portion has been glued, and the quality of the adhesion condition (i.e., the sealing condition) can be determined (see Patent Literature 1).

Such a determination method, however, has shortcomings in that there may be an error in the determination of the sealing condition.

Accordingly, in the present invention, two or more thermal images are acquired by capturing an image of a sealing portion at least twice, and a change over time in the intensity of energy emitted from an adhesive in the sealing portion is calculated. The quality of the sealing is determined based on the calculated change over time in the intensity of the energy, and this makes it possible to reduce the possibility of the determination error described above and to determine the quality of the sealing more accurately.

Hereinafter, an embodiment of the present invention will be described with reference to the drawings. It is to be noted that the embodiment described below merely illustrates some general or specific examples of the present invention. Therefore, the numerical values, the constituent elements, the arrangement positions and the connection modes of the constituent elements, the steps, the order of the steps, and so on illustrated in the following embodiment are examples and are not intended to limit the present invention. Accordingly, among the constituent elements described in the following embodiment, any constituent element that is not cited in independent claims of the present invention is to be construed as an optional constituent element.

Furthermore, the drawings are schematic diagrams and do not necessarily provide the exact depictions. Therefore, the scales and so on do not necessarily match among the drawings. In the drawings, substantially identical components are given identical reference characters, and duplicate descriptions thereof will be omitted or simplified.

Embodiment

Configuration

First, with reference to FIG. 1, an object of which the quality of sealing is determined by a determination device according to an embodiment will be described. FIG. 1 is a first diagram for describing a process of forming an object according to an embodiment.

FIG. 1 illustrates object 10 of which the quality of sealing is determined in the present embodiment. FIG. 1 further illustrates material to be sealed 10*a* for forming object 10.

Material to be sealed 10a corresponds to object 10 that has not been subjected to a sealing process. FIG. 1 illustrates only a portion of object 10 and material to be sealed 10a including a sealing part that is to be sealed, and the remaining portion is omitted. Material to be sealed 10a according to the present embodiment is a base material having a tubular shape extending in a predetermined direction. Closing the two ends of material to be sealed 10a in the predetermined direction turns material to be sealed 10a into box-shaped object 10 having thereinside a space that can store an item. In this example, object 10 is formed upon material to be sealed 10a having undergone a sealing process, and there may be object 10 with a good sealing condition as well as object 10 with a defective sealing condition.

The following describes various processes for forming object 10 with a good sealing condition. However, the described processes may result in object 10 with a defective sealing condition, and determination device 100 described later determines at least one of whether the sealing condition of object 10 is good or whether the sealing condition of object 10 is defective. In other words, a determination method described in the present embodiment determines whether an object is good or not, whether an object is defective or not, or whether an object is good or defective. In this manner, the determination method described in the present embodiment determines the quality of bonding more accurately.

The base material formed in a tubular shape in the present embodiment has a rectangular section. Therefore, material to be sealed 10a, which corresponds to an object that has not been subjected to a sealing process, is turned into object 10 of a hexahedron box through the process of closing the two ends of material to be sealed 10a. In this example, it suffices that the sealing process be used in the process of closing at least one of the two ends of material to be sealed 10a in the predetermined direction described above. In the process of closing the other end of material to be sealed 10a, a structure where the configuration of the base material allows the end to be locked by the mass of an item to be placed inside object 10 may be used, and examples include the so-called "auto-lock bottom" or the "snap-lock bottom".

As illustrated in FIG. 1, in the present embodiment, four flaps formed at one end of material to be sealed 10a are folded so as to overlap each other. The two of the flaps that lie on top of each other are glued to each other by adhesive 27 to achieve sealing, and this produces a lid panel that covers an opening in at least one end of the tubular body in the predetermined direction.

In the example described below in the present embodiment, "adhesive bonding" is used in which adhesive 27 is used for bonding as described above in order to bond and seal material to be sealed 10a. In the present invention, sealing of material to be sealed 10a may be performed through other methods, such as heat sealing or ultrasonic sealing, in which material to be sealed 10a itself is molten and bonded.

Illustrated in (a) in FIG. 1 is material to be sealed 10a of which none of the flaps are folded. Illustrated in (b) in FIG. 1 is material to be sealed 10a of which side flaps 21 are folded in the respective directions indicated by the arrows illustrated in (a) in FIG. 1. Illustrated in (c) in FIG. 1 is material to be sealed 10a of which inner lid flap 23 is folded in the direction indicated by the arrow illustrated in (b) in FIG. 1. Illustrated in (d) in FIG. 1 is object 10 formed as outer lid flap 25 has been sealed upon being folded in the direction indicated by the arrow illustrated in (c) in FIG. 1.

In (d) in FIG. 1, adhesive 27 over which outer lid flap 25 is placed is shown in the dashed line through outer lid flap 25.

As illustrated in (a) in FIG. 1, first, of the four flaps of material to be sealed 10a, two side flaps 21 are folded. Two side flaps 21 are folded toward the inner side of the open tubular body in the respective directions indicated by the arrows illustrated in (a) in FIG. 1. Then, as illustrated in (b) in FIG. 1, inner lid flap 23 of material to be sealed 10a is folded. Inner lid flap 23 is folded toward the inner side of the open tubular body in the direction indicated by the arrow illustrated in (b) in FIG. 1. Inner lid flap 23 is placed on top of each of side flaps 21 that have already been folded.

At this point, adhesive 27 is applied onto inner lid flap 23 (i.e., the surface of inner lid flap 23 where inner lid flap 23 is not in contact with side flaps 21). In order to glue inner lid flap 23 and outer lid flap 25 together, it is desirable that adhesive 27 be spread in as wide an area as possible on inner lid flap 23 and outer lid flap 25. In other words, in a case where inner lid flap 23 and outer lid flap 25 are each an elongated flap as illustrated in FIG. 1, it is desirable that adhesive 27 be applied in an elongated area extending along the lengthwise direction of inner lid flap 23. In this example, there is no particular limitation on the shape of applied adhesive 27 in determining the quality of sealing. Adhesive 27 may be applied in a multi-dot pattern or may be applied in a wave pattern that oscillates in the widthwise direction of a given flap such that adhesive 27 widely covers that flap. Adhesive 27 is applied after inner lid flap 23 has been folded as described above and before outer lid flap 25 is folded. In this example, adhesive 27 is implemented by a hot-melt adhesive that contains, as a main component, a thermoplastic resin, such as ethylene vinyl acetate, an ethylene-based copolymer, polyolefin, or polyamide, for example.

Next, as illustrated in (c) in FIG. 1, outer lid flap 25 is folded. Outer lid flap 25 is folded toward the inner side of the open tubular body in the direction indicated by the arrow illustrated in (c) in FIG. 1. Outer lid flap 25 is placed on top of inner lid flap 23 that has already been folded, and outer lid flap 25 comes into contact with adhesive 27 applied on inner lid flap 23. In this state, adhesive 27 emits heat energy as energy. Thus, the temperature of adhesive 27 decreases, adhesive 27 hardens, and inner lid flap 23 and outer lid flap 25 are glued to each other. As inner lid flap 23 and outer lid flap 25 become glued to each other and sealed, object 10 illustrated in (d) in FIG. 1 is formed. In the present embodiment, the quality of sealing performed by use of adhesive 27 used to form a lid panel in object 10 formed as described above is determined.

Objects that determination device 100 according to the present invention can work with may include any packaging material formed by use of an adhesive, and such packaging materials include not only a box-shaped packaging material but also an envelope-like packaging material and a large cardboard box. Moreover, determination device 100 according to the present invention is capable of determining the adhesion condition not only of a packaging material but also of any object as long as that object is formed with its adhesion parts glued to each other by an adhesive. Specifically, determination device 100 can be applied to any use, including making a determination on the interior of an automobile that is affixed by an adhesive or an electronic component on a circuit board fixed by an adhesive.

Figure 2:
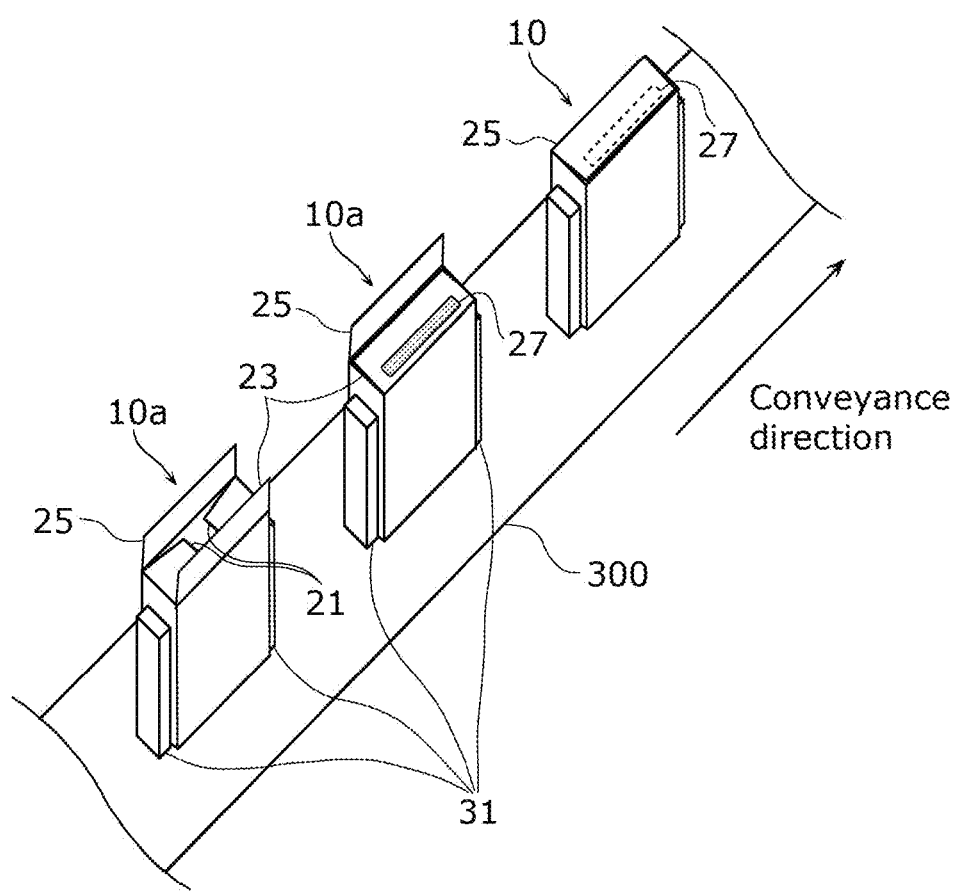
FIG. 2 is a second diagram for describing a process of forming an object according to an embodiment.

FIG. 2 is a second diagram for describing a process of forming an object according to the embodiment. Material to be sealed 10a conveyed on conveyance path 300 has its flaps folded and is sealed by adhesive 27 applied to the flaps. Thus, object 10 described above with reference to FIG. 1 is formed. In other words, sealing system 500 (see FIG. 5 described later) according to the present embodiment includes conveyance path 300, forms object 10 by sealing material to be sealed 10a on conveyance path 300 by use of adhesive 27, and determines the quality of this sealing of object 10.

For example, in FIG. 2, material to be sealed 10a is conveyed on conveyance path 300 in the conveyance direction extending toward the upper right section of the paper plane as indicated by the arrow. As illustrated in FIG. 2, the flaps are folded in the direction that follows the conveyance direction or in the direction intersecting the conveyance direction, and the outer surface of inner lid flap 23 and the inner surface of outer lid flap 25 are sealed to each other by the adhesive. Thus, object 10 is formed. In FIG. 2, sealing device 200 and determination device 100 are omitted from the illustration.

Conveyance path 300 is, for example, a device such as a belt conveyor system that moves and conveys an item placed thereon in a predetermined direction by use of rotary driving of a motive power source. As illustrated in FIG. 2, conveyance path 300 is provided with holders 31 for holding material to be sealed 10a and object 10 at predefined intervals.

In the present embodiment, each holder 31 is a member that extends from conveyance path 300 in the direction in which material to be sealed 10a and object 10 are placed onto conveyance path 300, and a plurality of holders 31 disposed on conveyance path 300 are spaced apart from each other by a gap substantially equal to the dimension of material to be sealed 10a or object 10 in the conveyance direction. Material to be sealed 10a or object 10 is disposed between two holders 31 among the plurality of holders 31. Thus, material to be sealed 10a or object 10 is pinched by two holders 31 and is conveyed stably on conveyance path 300. Moreover, as material to be sealed 10a is held by holders 31, material to be sealed 10a can be retained at a predefined position against the force applied to each flap when the flaps are folded, and this allows the flaps to be folded smoothly. It is to be noted that the manner in which holders 31 are installed is not limited to the one described above. Holders 31 may be implemented by any members that can retain the position of material to be sealed 10a or object 10 being conveyed on conveyance path 300 constant. Furthermore, holders 31 may have a function of keeping material to be sealed 10a in a tubular shape by folding up material to be sealed 10a. In other words, two holders 31 define the positions of two sides of the rectangular section of folded material to be sealed 10a in accordance with the distance between two holders 31 and thus define the positions of the remaining two sides. This configuration can retain the rectangular section and keep the tubular shape of material to be sealed 10a.

Figure 3:
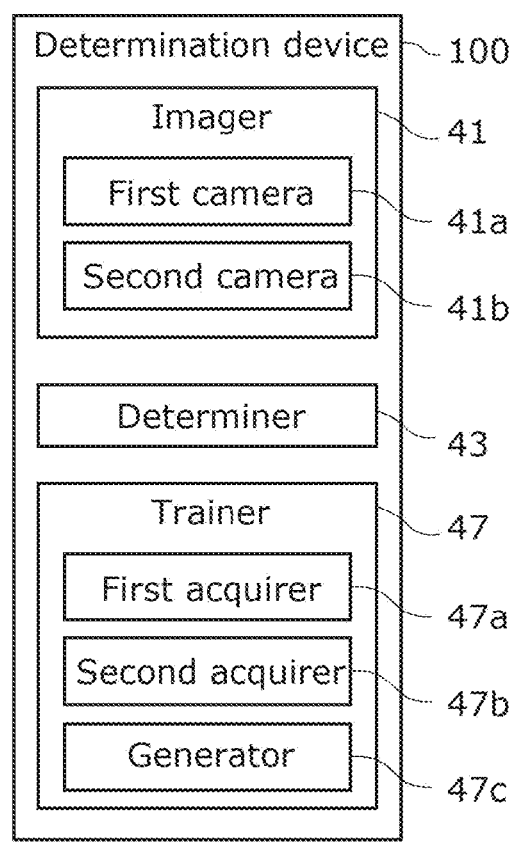
FIG. 3 is a block diagram illustrating a functional configuration of a determination device according to an embodiment.

FIG. 3 is a block diagram illustrating a functional configuration of the determination device according to the embodiment. As illustrated in FIG. 3, determination device 100 according to the present embodiment includes imager 41, determiner 43, and trainer 47.

Imager 41 is a camera that captures an image of object 10 subjected to a sealing process performed by sealing device 200 by use of adhesive 27 and that acquire a distribution of the intensity of energy emitted from the adhesive. Specifically, imager 41 acquires a distribution of the intensity of heat energy emitted from adhesive 27 that has been applied onto material to be sealed 10a while adhesive 27 is molten by heat. In other words, imager 41 acquires a thermal image that is based on the emitted heat energy. Therefore, imager 41 is implemented by a thermal camera capable of acquiring a thermal image. A thermal image is generated by acquiring the heat energy emitted in accordance with the amount of heat in the adhesive in each of a plurality of elements arrayed two-dimensionally and by converting the intensity of the heat energy acquired in each element into a numerical value. In this manner, a two-dimensional intensity distribution of the heat energy is acquired by imager 41.

It is to be noted that the energy that imager 41 can acquire is not limited to the heat energy in the present invention. The present invention can be implemented as long as the configuration of imager 41 allows imager 41 to acquire a given type of energy regardless of what type of energy is to be acquired.

Imager 41 includes first camera 41a and second camera 41b, and first camera 41a and second camera 41b are each a thermal camera described above. First camera 41a acquires a first distribution that is a thermal image of object 10 captured at a first time point. Second camera 41b is a camera different from first camera 41a. Second camera 41b acquires a second distribution that is a thermal image of object 10 captured at a second time point that is later than the first time point.

First camera 41a and second camera 41b are disposed at respective positions corresponding to conveyance path 300 on which material to be sealed 10a and object 10 are conveyed. Specifically, first camera 41a is disposed at a first position where first camera 41a can capture an image of object 10 conveyed on conveyance path 300 at the first time point. Meanwhile, second camera 41b is disposed at a second position where second camera 41b can capture an image of object 10 conveyed on conveyance path 300 at the second time point.

Disposing first camera 41a and second camera 41b at different positions as described above makes it possible to capture images of object 10 on a more extended time scale. For example, continuous images of object 10 are captured from the first position by first camera 41a, and continuous images of object 10 are captured from the second position by second camera 41b. This configuration makes it possible to determine the quality of sealing of object 10 based on three different perspectives including a plurality of thermal images captured from the first position, a plurality of thermal images captured from each of the first position and the second position, and a plurality of thermal images captured from the second position.

Yet, depending on the configuration of conveyance path 300, conveyance path 300 may perform intermittent conveyance. In this case, object 10 is conveyed in a stop-and-go manner. Therefore, first camera 41a and second camera 41b are disposed so as to correspond to the respective positions where object 10 stops. This configuration makes it possible to capture the images of object 10 from substantially the same viewpoint but at different timings with ease while object 10 is conveyed.

If it is possible to determine the quality of sealing through imaging of object 10 on a short time scale, the present invention can be implemented with first camera 41a alone. Moreover, imager 41 may be implemented by a single camera as long as that camera has a wide-angle optical system of which the range of the angle of view can cover both object 10 located at the position corresponding to the first time point and object 10 located at the position corresponding to the second time point.

Determiner 43 is a processing block that calculates, based on the first distribution and the second distribution, the change over time in the intensity of the heat energy emitted from adhesive 27 and that determines the quality of sealing based on the calculated change over time. The processing block serving as determiner 43 is implemented by a processor and a memory connected to the processor. The processing block implements the functions of determiner 43 described above as the processor and the memory execute programs for various processes.

Figure 4:
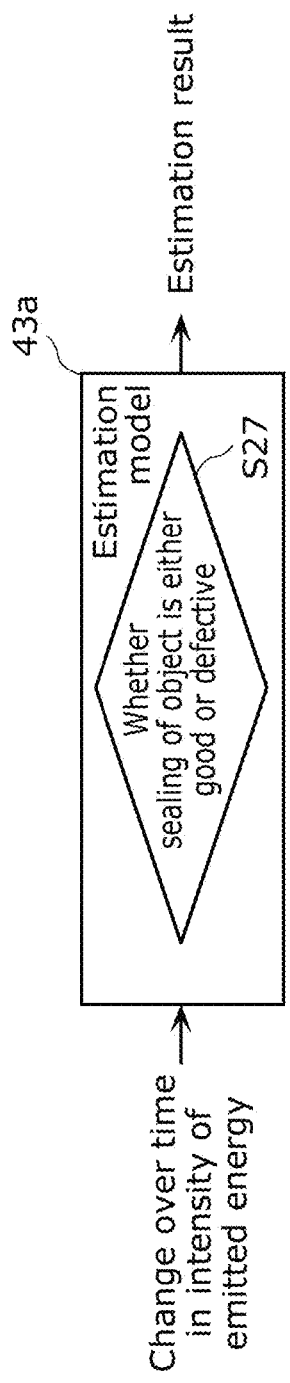
FIG. 4 is an illustration for describing an estimation model included in a determiner according to an embodiment.

FIG. 4 is an illustration for describing an estimation model included in the determiner according to the embodiment. Determiner 43 includes estimation model 43a for estimating the quality of sealing of object 10 based on the change over time in the intensity of the heat energy emitted from adhesive 27 and determines the quality of sealing by use of estimation model 43a. Specifically, determiner 43 inputs the change over time in the intensity of the heat energy emitted from adhesive 27 calculated based on the first distribution and the second distribution into estimation model 43a generated and trained in advance through machine learning.

Estimation model 43a is an estimation model that is included in a program to be executed by a computer and that outputs output data estimated based on the entered input data. As illustrated in FIG. 4, estimation model 43a estimates whether the sealing condition of object 10 is either good or defective based on the entered input data (S27, also see FIG. 8 described later). Estimation model 43a outputs its estimation result as output data. In other words, in response to receiving, as input data, the change over time in the intensity of the energy emitted from adhesive 27 calculated based on each of the intensity of the energy emitted from adhesive 27 sealing object 10 at the first time point and the intensity of the energy emitted from adhesive 27 sealing object 10 at the second time point, estimation model 43a estimates the quality of sealing of object 10 and outputs the estimation result as its output data.

It is to be noted that the estimation result according to the present embodiment is output as a determination result of determiner 43. The relationship between the estimation result of estimation model 43a and the determination result of determiner 43 will be described later in the description of the determination on the sealing condition.

In this manner, determiner 43 makes a determination by using trained estimation model 43a generated through machine learning. Referring back to FIG. 3, a configuration for generating estimation model 43a described above will now be described. Trainer 47 is a processing block that trains estimation model 43a through machine learning by using, as training data, the change over time in the intensity of the heat energy emitted from adhesive 27 and the determination result indicating the quality of sealing of object 10. As with determiner 43 described above, the processing block serving as trainer 47 is implemented by a processor and a memory connected to the processor.

Trainer 47 generates estimation model 43a as a trained model trained through machine learning before determination device 100 is shipped out, and this estimation model 43a is stored, for example, into the memory of determiner 43. Trainer 47 is an example of a generation device that includes first acquirer 47a, second acquirer 47b, and generator 47c. First acquirer 47a is, for example, a processing block that acquires the change over time in the intensity of the energy emitted from adhesive 27 calculated by determiner 43. Meanwhile, second acquirer 47b is, for example, a processing block that acquires information concerning the result of the determination made by the user as to the quality of formed object 10 and entered via a user interface (not illustrated) connected to determination device 100. Generator 47c generates and optimizes estimation model 43a through machine learning by using, as training data, the change over time in the intensity of the energy emitted from adhesive 27 and the information concerning the determination result.

In a case where the user of determination device 100 uses only generated estimation model 43a, trainer 47 does not need to be provided. However, if it is assumed that the user of determination device 100 will optimize estimation model 43a in accordance with the intended use of determination device 100 after determination device 100 has been shipped out, determination device 100 that includes trainer 47 is provided. Thus, in accordance with the user's intended use of determination device 100, trainer 47 further optimizes estimation model 43a through machine learning by using, as training data, the change over time in the intensity of the heat energy emitted from adhesive 27 and the determination result indicating the quality of sealing of object 10.

Figure 5:
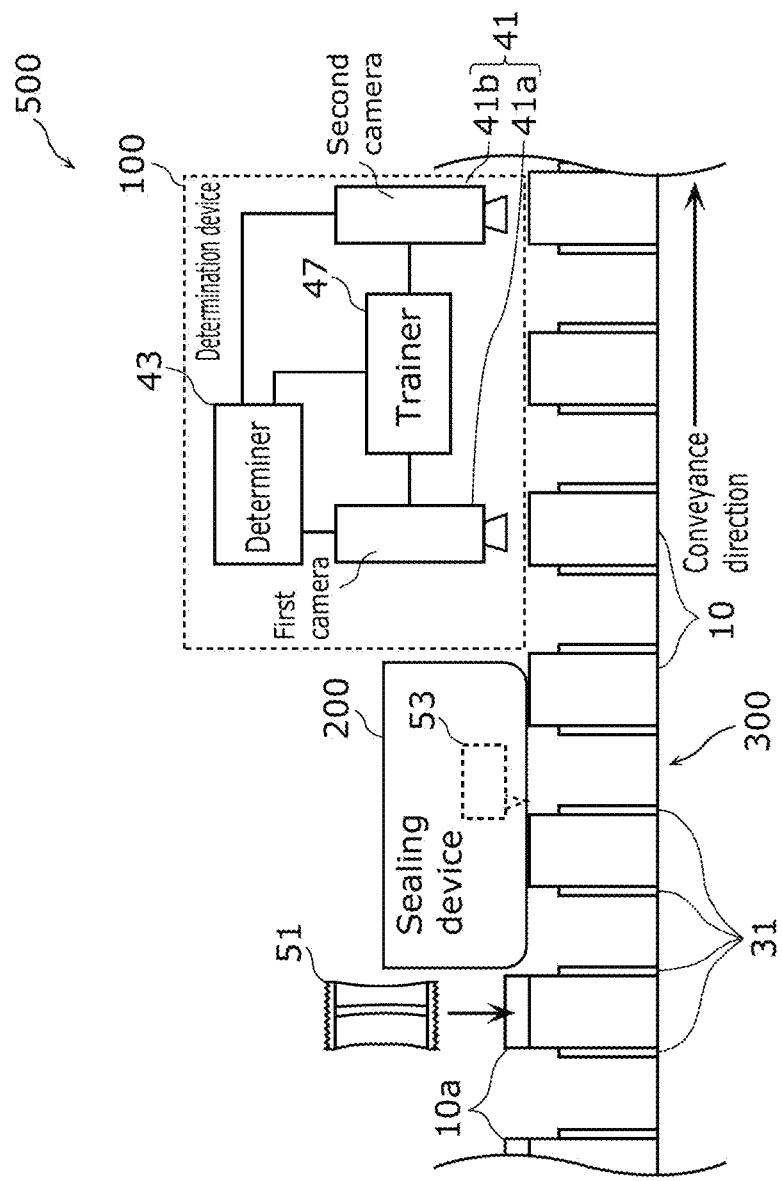
FIG. 5 is a schematic diagram for describing a configuration of a sealing system according to an embodiment.

FIG. 5 is a schematic diagram for describing a configuration of a sealing system according to an embodiment. As illustrated in FIG. 5, in sealing system 500, contents 51 are placed into each of materials to be sealed 10a arrayed side by side and conveyed on conveyance path 300 in the conveyance direction. There is no particular limitation on the details of contents 51, the number of items contained therein, or the shape of contents 51, and the user of sealing system 500 can determine these specifics as desired.

After contents 51 are placed in material to be sealed 10a, material to be sealed 10a passes the location that corresponds to sealing device 200. Sealing device 200 performs a sealing process on passing material to be sealed 10a and forms object 10. At this point, sealing device 200 applies molten adhesive 27 onto one of the adhesion parts via dispenser 53. Dispenser 53 may be movable or stationary depending on how adhesive 27 is applied. As adhesive 27 is applied and the flaps are folded on top of each other, the sealing process is completed to yield object 10, and this object 10 passes the location that corresponds to determination device 100. Determination device 100 makes a determination on the quality of the sealing of passing object 10. As described above, the determination in determination device 100 is made by determiner 43 by use of estimation model 43a generated in advance by trainer 47 based on the first distribution and the second distribution that are the thermal images acquired by first camera 41a and second camera 41b, respectively.

Determination on Sealing Condition

Figure 6:
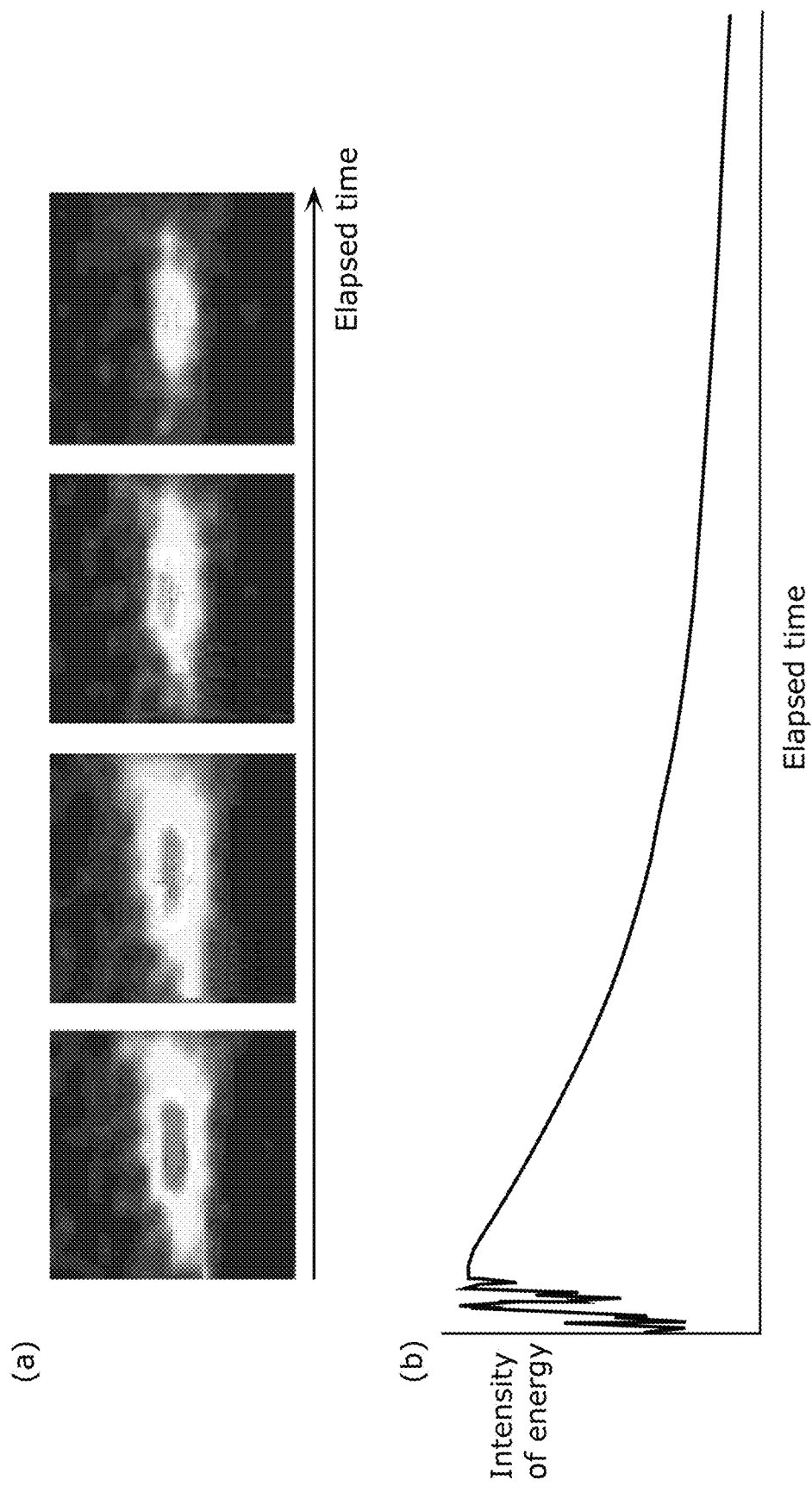
FIG. 6 is a diagram illustrating an example of a distribution of the intensity of energy acquired in an embodiment.

Next, the sealing condition on which the determination is made according to the present embodiment will be described. FIG. 6 is a diagram illustrating an example of a distribution of the intensity of the energy acquired in the embodiment.

In (a) in FIG. 6, four example thermal images acquired by imager 41 at respective time points along the elapsed time are illustrated. As illustrated in (a) in FIG. 6, each acquired thermal image shows a stepwise distribution of temperatures from a high-temperature area (the gray area at the center of each thermal image) to a low-temperature area (the white area surrounding the center in each thermal image). The area with the temperature represented by the white area or the gray area corresponds to the area where adhesive 27 is present, and the thermal images each show the process in which the heat applied to melt the adhesive is emitted from the adhesive to the outside. In (a) in FIG. 6, the size of the gray area gradually decreases and the size of the white area also decreases along with the elapsed time. In other words, the thermal images show that, as the heat energy is emitted from adhesive 27, the heat held in adhesive 27 is reduced and the emitted energy gradually decreases. The black area located along the periphery of each thermal image corresponds to the area that is outside the adhesive and is at a temperature (can be regarded substantially as a surrounding environmental temperature) lower than that of the white area.

In this example, determiner 43 calculates the change over time in the intensity of the energy, such as the one illustrated in (b) in FIG. 6, based on, among the acquired thermal images, the thermal image indicating the first distribution that is one of at least four acquired thermal images and the thermal image indicating the second distribution acquired at a time point later than when the first distribution has been acquired. For example, determiner 43 determines a pixel of a representative point indicating the highest temperature from the thermal image acquired first among the thermal images and identifies a pixel in each of the other thermal images that corresponds to the pixel of the representative point. In this manner, determiner 43 calculates the change over time in the intensity of the energy described above indicated by a curve that connects smoothly the energy intensity at the determined pixel of the representative point and the energy intensity of each of the identified pixels that correspond to the pixel of the representative point.

With regard to the sealing of object 10, the curve indicating the change over time in the intensity of the energy described above tends to be less steep when the two adhesion parts do not coincide with each other and there is an anomaly than when the two adhesion parts are glued to each other properly. This tendency appears due to the fact that a heat insulating layer is formed by the air between the two adhesion parts as the two adhesion parts are farther apart from each other. When the two adhesion parts are glued to each other properly, the heat held in adhesive 27 flows toward the adhesion parts having a large heat capacity. In contrast, when the two adhesion parts are apart from each other, the heat insulating layer formed by the air helps to enhance the heat retention effect and retains the heat for a more extended time. Therefore, determining the quality of sealing of object 10 based on the change over time in the intensity of the energy as described above makes it possible to determine whether the two adhesion parts are glued to each other properly or whether the two adhesion parts are apart from each other and there is an anomaly. Thus, the quality of adhesion in the sealing can be determined more accurately. In other words, the quality of the sealing can be determined more accurately.

The method described above does not limit how determiner 43 calculates the change over time in the intensity of the energy. For example, each thermal image may be subjected to binarization by use of a threshold, and the change over time in the intensity of the energy described above may be calculated based on the area of the pixels that have a value greater than the threshold.

Alternatively, determiner 43 may calculate the change over time in the intensity of the energy described above for each individual pixel without determining the pixel of the representative value and the pixels corresponding to the pixel of the representative value. Although these methods of calculating the change over time described above require certain processing performance for the processor that executes determiner 43, such methods make it possible to obtain a larger amount of information. Such a configuration, for example, makes it possible to distinguish between the area of adhesive 27 where adhesive 27 provides proper adhesion and the area of adhesive 27 where there is an anomaly. For example, when 90% or more of the total area where adhesive 27 is applied through the control of dispenser 53 is glued properly, it may be determined that this sealing is good. In other words, in one possible quality determination, a defect of 10% may be permitted.

A final determination result may be obtained not simply based on the calculated change over time in the intensity of the energy but also in consideration of factors such as the breakage, the partial absence, the shortage, the excess, or the position of adhesive 27 determined based on the presence and the area of applied adhesive 27 that can be found from the acquired thermal images. In this case, each of these factors may be incorporated into the estimation performed by estimation model 43a. In other words, estimation model 43a trained, through machine learning, on the permissible range with respect to each of the factors in determining the quality of sealing may be generated, and a comprehensive estimation result obtained by generated estimation model 43a may be output as the determination result of determiner 43.

Alternatively, estimation results on only some of the factors may be output as the determination result of estimation model 43a on the quality of sealing, and a comprehensive determination result may be output that takes into account the determination made by determiner 43 by use of the threshold with respect to the remaining factors. For example, determiner 43 may estimate as to only whether the adhesion is proper or anomalous by use of estimation model 43a based on the calculation of the change over time in the energy intensity, make a determination on the other factors based on the threshold, and output a comprehensive determination result based on the two.

Alternatively, determiner 43 may make a determination on all of the factors, including the determination on whether the adhesion is proper or anomalous made based on the calculation of the change over time in the energy intensity that is determined based on whether the rate of the change over time in the intensity of the heat energy emitted from adhesive 27 is lower than a predetermined rate set as the threshold, by using the threshold without using estimation model 43a, and may output a comprehensive determination result that takes the above into account.

Operation

Figure 7:
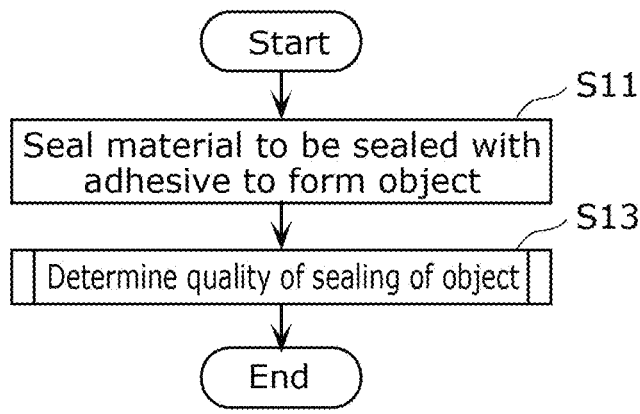
FIG. 7 is a flowchart illustrating an operation of a sealing system according to an embodiment.

Next, with reference to FIGS. 7 to 9, an operation of each device for determining the quality of the sealing condition according to the present embodiment will be described. FIG. 7 is a flowchart illustrating an operation of the sealing system according to the embodiment.

As illustrated in FIG. 7, according to the present embodiment, sealing system 500 applies, via sealing device 200, adhesive 27 to one of the adhesion parts (e.g., to the surface of inner lid flap 23 illustrated in FIG. 1) of material to be sealed 10a conveyed on conveyance path 300. Adhesive 27 is applied by dispenser 53 of sealing device 200. Adhesive 27 applied to the one of the adhesion parts is being molten by heat and hardens as adhesive 27 emits heat energy to its surroundings. Sealing device 200 folds outer lid flap 25 before adhesive 27 hardens, and adhesive 27 hardens while the adhesion parts are in contact with each other via adhesive 27. Thus, the adhesion parts are glued to each other. In this manner, material to be sealed 10a is sealed by adhesive 27, and object 10 is formed (sealing step S11).

Then, sealing system 500 determines, via determination device 100, the quality of the sealing condition of object 10 (determination step S13). The details of determination step S13 are given below with reference to FIG. 8. FIG. 8 is a flowchart illustrating an operation of the determination device according to the embodiment.

Figure 8:
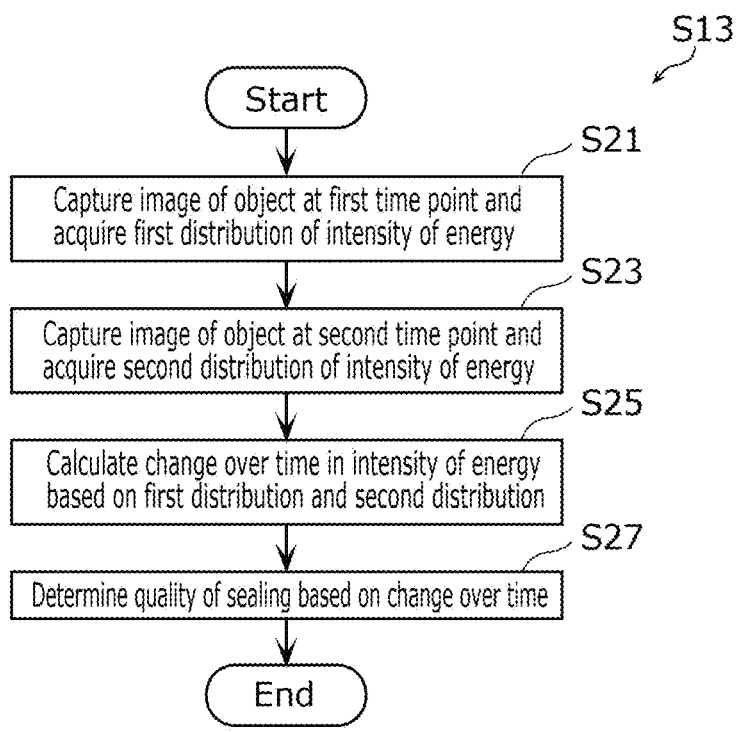
FIG. 8 is a flowchart illustrating an operation of a determination device according to an embodiment.
Figure 9:
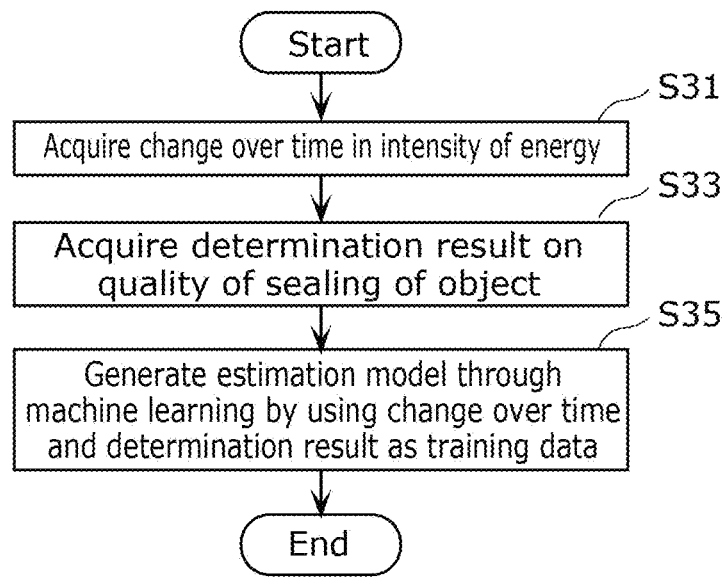
FIG. 9 is a flowchart illustrating an operation performed by a trainer to generate an estimation model according to an embodiment.

As illustrated in FIG. 8, determination step S13 is further divided into four steps S21 to S27. Specifically, determination device 100 first captures an image of object 10 at the first time point and acquires the first distribution of the intensity of the heat energy emitted from adhesive 27 retaining the heat applied thereto to melt adhesive 27 (step S21). The first distribution is acquired by first camera 41a of imager 41. First camera 41a acquires, as the first distribution, a two-dimensional distribution of the intensity of the heat energy corresponding to the two-dimensional surface of the image sensor in first camera 41a.

Then, determination device 100 captures an image of object 10 at the second time point that is later than the first time point and acquires the second distribution of the intensity of the heat energy emitted from adhesive 27 retaining the heat applied thereto to melt adhesive 27 (step S23). The second distribution is acquired by second camera 41b of imager 41. Second camera 41b acquires, as the second distribution, a two-dimensional distribution of the intensity of the heat energy corresponding to the two-dimensional surface of the image sensor in second camera 41b. Step S21 and step S23 in combination may be regarded as an imaging step of acquiring the distributions of the intensity of the energy emitted from adhesive 27.

The acquired first distribution and the acquired second distribution are output to determiner 43. Determiner 43 calculates the change over time in the intensity of the heat energy emitted from adhesive 27 based on the first distribution and the second distribution acquired by imager 41 (step S25). Specifically, determiner 43 determines a pixel of a representative value in the thermal image indicating the first distribution. In addition, determiner 43 identifies, in the thermal image indicating the second distribution, a pixel corresponding to the pixel of the representative value. Based on the value of the intensity of the heat energy at each of the pixel of the representative value and the pixel corresponding to that pixel of the representative value as well as on the time interval between the first time point and the second time point, determiner 43 calculates, as the change over time in the intensity of the heat energy, the value of the change in the intensity of the heat energy per unit time. The change over time in the intensity of the heat energy may be calculated through a different method, as described above in the determination of the sealing condition.

Determiner 43 further determines the quality of sealing based on the calculated change over time in the intensity of the heat energy (step S27). Determiner 43 determines the quality of sealing by use of estimation model 43a that is based on machine learning as described above. Determiner 43 outputs its determination result on the quality of sealing based on an estimation result output by estimation model 43a. When step S21 and step S23 in combination are regarded as an imaging step of acquiring the distributions of the intensity of the energy emitted from adhesive 27, step S25 and step S27 in combination may be regarded as a determination step. In other words, the operation of determination device 100 may be regarded as the determination step including the imaging step, or only the more detailed process performed by determiner 43 may be regarded as the determination step.

The determination result on the quality of the sealing condition obtained by determiner 43 is provided to, for example, the user of determination device 100. In other words, information that includes the determination result is presented to the user in a visible form. Such a presentation may be implemented by a display device, such as a display, provided on sealing system 500 or by a mobile terminal, such as a smartphone, owned by the user. Alternatively, instead of being provided to the user, the determination result may be accumulated in a database or the like included in a server device.

An operation for generating estimation model 43a described above will now be further described with reference to FIG. 9. FIG. 9 is a flowchart illustrating an operation performed by the trainer to generate an estimation model according to the embodiment.

Estimation model 43a is generated by trainer 47 (i.e., the generation device). In generating estimation model 43a, first, the change over time in the intensity of the heat energy emitted from adhesive 27 is acquired (step S31). The change over time in the intensity of the heat energy is acquired by first acquirer 47a. Next, the determination result on the quality of sealing of object 10 is acquired (step S33). This determination result is different from the determination result of determination device 100 and is a result of the determination made by an administrator, such as the user, on the quality of the sealing condition of actual object 10. This determination result is acquired by second acquirer 47b. In this example, the change over time in the intensity of the heat energy and the determination result may be acquired from a data set generated in advance that includes a plurality of sets of the change over time in the intensity of the heat energy and the determination result.

Generator 47c of trainer 47 generates estimation model 43a through machine learning by using, as training data, the acquired change over time in the intensity of the heat energy and the acquired determination result. Specifically, generator 47c generates estimation model 43a, for example, by optimizing (updating the weight in) a neural network consisting of multiple layers through deep learning with the use of the training data described above. In the determination step described above, the determination result is output based on the estimation made through estimation model 43a generated as described above.

Advantageous Effects and Others

As described thus far, determination device 100 according to the present embodiment includes imager 41 and determiner 43. Imager 41 captures an image of object 10 subjected to a sealing process by use of adhesive 27 and acquires the distribution of the intensity of the energy emitted from adhesive 27. Determiner 43 calculates the change over time in the intensity of the energy emitted from adhesive 27 based on a first distribution indicating the distribution acquired from an image captured by imager 41 at a first time point and a second distribution indicating the distribution acquired from an image captured by imager 41 at a second time point that is later than the first time point. Determiner 43 also determines the quality of sealing based on the calculated change over time.

According to this configuration, determination device 100 can acquire, via imager 41, at least two distributions including the first distribution and the second distribution each indicating a distribution of the intensity of the energy emitted from adhesive 27. The change over time in the intensity of the energy emitted from adhesive 27 can be calculated from the amount of change in the intensity of the energy emitted from adhesive 27 represented by the difference between the acquired first distribution and the acquired second distribution with respect to the time elapsed from the first time point to the second time point. Determination device 100 can determine the quality of sealing of object 10 based on whether the calculated change over time corresponds to the change over time to be observed when the sealing condition is good or to the change over time to be observed when the sealing condition is defective. In other words, determination device 100 can make a determination based on the difference between the change over time in the intensity of the energy associated with the area of contact with the air held when the sealing condition is good and the change over time in the intensity of the energy associated with the area of contact with the air held when the sealing condition is defective. Therefore, determination device 100 can make a determination based not only on the presence or the area of applied adhesive 27 but also on the difference in the area where adhesive 27 is in contact with the air. Thus, the quality of sealing can be determined more accurately. In turn, the quality of adhesion can be determined more accurately.

For example, imager 41 may include first camera 41*a* that acquires the first distribution and second camera 41*b* that acquires the second distribution, and first camera 41*a* and second camera 41*b* may differ from each other.

According to this configuration, imager 41 can acquire the first distribution and the second distribution by use of first camera 41*a* and second camera 41*b*. Determination device 100 can be designed such that a first position where the first distribution is acquired and a second position where the second distribution is acquired are spaced apart from each other. Since the time gap between the first time point and the second time point can be designed flexibly, even in a case where the change over time in the emitted energy spans over a relatively extended time scale, the first distribution and the second distribution that allow the change over time to be calculated sufficiently can be acquired. Thus, the quality of sealing can be determined more accurately. In turn, the quality of adhesion can be determined more accurately.

For example, adhesive 27 may be applied to a predetermined part (one of the adhesion parts) of material to be sealed 10*a*, which corresponds to object 10 that has not been subjected to the sealing process, while adhesive 27 is molten by heat. In addition, adhesive 27 may harden as adhesive 27 emits heat energy as the energy emitted therefrom, and imager 41 may acquire the distribution of the intensity of the heat energy emitted from adhesive 27 applied to the predetermined part.

According to this configuration, the amount of heat used to melt adhesive 27 can be used to calculate the change over time in the intensity of the energy emitted from adhesive 27 in the quality determination. This can help reduce the number of constituent elements to be added for the quality determination. Therefore, the quality of sealing can be determined with a simple configuration.

For example, determiner 43 may determine that the sealing of object 10 is defective if the rate of the change over time calculated based on the first distribution and the second distribution is lower than a predetermined rate.

According to this configuration, the quality of adhesion can be determined based on a determination where a threshold is used. This makes it possible to determine the quality of adhesion through a simple comparison of numerical values, and thus the quality determination does not require a high processing performance. Therefore, the quality of sealing can be determined with a simple configuration.

For example, determiner 43 may include estimation model 43*a* for estimating the quality of sealing of object 10 based on the change over time, and determiner 43 may determine the quality of sealing based on estimation model 43*a*.

This configuration makes it possible to determine the quality of sealing by use of estimation model 43*a* included in determiner 43. Determination device 100 can determine the quality of sealing more accurately based on estimation model 43*a* trained, through machine learning, on each of the feature amount observed in a good sealing condition and the feature amount observed in a defective sealing condition appearing in the change over time in the emitted energy. In turn, the quality of adhesion can be determined more accurately.

For example, determination device 100 may further include trainer 47 that trains estimation model 43*a* through machine learning by using, as training data, the change over time and the determination result on the quality of sealing of object 10.

This configuration makes it possible to optimize estimation model 43*a* and determine the quality of the sealing condition in accordance with the situation where the user uses determination device 100. Thus, the quality of sealing can be determined more accurately. In turn, the quality of adhesion can be determined more accurately.

Sealing system 500 according to the present embodiment includes sealing device 200 and determination device 100 according to any one of the above. Sealing device 200 forms object 10 by sealing, with adhesive 27, material to be sealed 10*a*, which corresponds to object 10 that has not been subjected to a sealing process.

According to this configuration, sealing system 500 can seal material to be sealed 10*a* by use of sealing device 200 and can also determine the sealing condition of sealed object 10 by use of determination device 100. Moreover, sealing system 500 can directly acquire the conditions and so on of sealing performed by sealing device 200 and determine the quality of sealing based on the difference present between the conditions and so on of the sealing and actually sealed object 10. Thus, the quality of sealing can be determined more accurately. In turn, the quality of adhesion can be determined more accurately.

For example, sealing system 500 may further include conveyance path 300 on which material to be sealed 10*a* is conveyed. Sealing device 200 may form object 10 by sealing material to be sealed 10*a* on conveyance path 300. Moreover, determination device 100 may include imager 41 that includes first camera 41*a* and second camera 41*b* and that acquires the first distribution and the second distribution. First camera 41*a* may be disposed at a position where first camera 41*a* can capture an image of object 10 conveyed on conveyance path 300 at a first time point, and second camera 41*b* may be disposed at a position where second camera 41*b* can capture an image of object 10 conveyed on conveyance path 300 at a second time point.

This configuration allows sealing system 500 to seal material to be sealed 10*a* by use of sealing device 200 while material to be sealed 10*a* is being conveyed on conveyance path 300. Moreover, since first camera 41*a* and second camera 41*b* are disposed so as to correspond to the positions of conveyed object 10, sealing system 500 can determine the sealing condition of sealed object 10 by use of determination device 100 while object 10 is being conveyed on conveyance path 300. In this manner, sealing system 500 can be incorporated into a production line or the like.

For example, sealing system 500 may include sealing device 200 and determination device 100. Sealing device 200 may form object 10 by sealing, with adhesive 27, material to be sealed 10a, which corresponds to object 10 that has not been subjected to a sealing process. Determination device 100 may include imager 41 and determiner 43. Imager 41 may capture an image of object 10 and acquire the distribution of the intensity of the energy emitted from adhesive 27. Determiner 43 may calculate the change over time in the intensity of the energy emitted from adhesive 27 based on a first distribution indicating the distribution acquired from an image captured by imager 41 at a first time point and a second distribution indicating the distribution acquired from an image captured by imager 41 at a second time point that is later than the first time point. Determiner 43 may also determine the quality of sealing based on the calculated change over time. Determiner 43 may include estimation model 43a for estimating the quality of sealing of object 10 based on the change over time and determine the quality of sealing based on estimation model 43a.

According to this configuration, sealing system 500 can seal material to be sealed 10a by use of sealing device 200 and can further determine the sealing condition of sealed object 10 by use of determination device 100. Moreover, sealing system 500 can directly acquire the conditions and so on of sealing performed by sealing device 200 and determine the quality of sealing based on the difference present between the conditions and so on of the sealing and actually sealed object 10. The determination can be made by use of estimation model 43a. The quality of sealing can be determined more accurately based on estimation model 43a trained, through machine learning, on each of the feature amount observed in a good sealing condition and the feature amount observed in a defective sealing condition appearing in the change over time in the emitted energy. In turn, the quality of adhesion can be determined more accurately.

Estimation model 43a according to the present embodiment is included in a program to be executed by a computer and outputs output data estimated based on received input data. In response to receiving, as the input data, the change over time in the intensity of the energy emitted from adhesive 27 calculated based on the intensity of the energy emitted from adhesive 27 sealing object 10 at the first time point and the intensity of the energy emitted from adhesive 27 sealing object 10 at the second time point that is later than the first time point, estimation model 43a estimates the quality of sealing of object 10 and outputs the estimation result as the output data.

This configuration allows estimation model 43a to output an estimation result indicating the quality of sealing estimated based on an input of the change over time in the intensity of the energy emitted from adhesive 27.

A generation device (trainer 47) according to the present embodiment is trainer 47 that generates estimation model 43a for estimating the quality of sealing of object 10 based on the intensity of the energy emitted from adhesive 27 of object 10 sealed with adhesive 27. The generation device includes first acquirer 47a, second acquirer 47b, and generator 47c. First acquirer 47a acquires the change over time in the intensity of the energy emitted from adhesive 27 based on the intensity of the energy emitted from adhesive 27 sealing object 10 at a first time point and the intensity of the energy emitted from adhesive 27 sealing object 10 at a second time point that is later than the first time point. Second acquirer 47b acquires a determination result on the quality of sealing of object 10. Generator 47c generates estimation model 43a through machine learning by using, as training data, the change over time acquired by first acquirer 47a and the determination result acquired by second acquirer 47b.

This configuration makes it possible to generate estimation model 43a and to determine the quality of sealing more accurately through generated estimation model 43a. In turn, the quality of adhesion can be determined more accurately.

A determination method according to the present embodiment includes an imaging step and a determination step. The imaging step includes capturing an image of object 10 sealed with adhesive 27 and acquiring a distribution of the intensity of energy emitted from adhesive 27. The determination step includes calculating the change over time in the intensity of the energy emitted from adhesive 27 based on a first distribution indicating the distribution acquired from an image captured at a first time point in the imaging step and a second distribution indicating the distribution acquired from an image acquired at a second time point that is later than the first time point in the imaging step and determining the quality of sealing based on the calculated change over time.

This method makes it possible to acquire at least two distributions, including the first distribution and the second distribution, of the intensity of the energy emitted from adhesive 27 in the imaging step. The change over time in the intensity of the energy emitted from adhesive 27 can be calculated from the amount of change in the intensity of the energy emitted from adhesive 27 represented by the difference between the acquired first distribution and the acquired second distribution with respect to the time elapsed from the first time point to the second time point. The quality of sealing of object 10 can be determined based on whether the calculated change over time corresponds to the change over time to be seen when the sealing condition is good or the change over time to be seen when the sealing condition is defective. In other words, the determination can be made based on the difference between the change over time in the intensity of the energy associated with the area of contact with the air held when the sealing condition is good and the change over time in the intensity of the energy associated with the area of contact with the air held when the sealing condition is defective. Therefore, the determination can be made based not only on the presence or the area of applied adhesive 27 but also on the difference in the area where adhesive 27 is in contact with the air. Thus, the quality of sealing can be determined more accurately. In turn, the quality of adhesion can be determined more accurately.

A sealing method according to the present embodiment includes a sealing step and a determination step. The sealing step includes forming object 10 by sealing, with adhesive 27, material to be sealed 10a that has not been subject to a sealing process. The determination step includes acquiring a first distribution of the intensity of the energy emitted from adhesive 27 by capturing an image of object 10 at a first time point, acquiring a second distribution of the intensity of the energy emitted from adhesive 27 by capturing an image of object 10 at a second time point that is later than the first time point, calculating the change over time in the intensity of the energy emitted from adhesive 27 based on the acquired first distribution and the acquired second distribution, and determining the quality of sealing based on the calculated change over time.

This method makes it possible to seal material to be sealed 10a in the sealing step and further to determine the sealing condition of sealed object 10 in the determination step.

Moreover, the above method makes it possible to acquire directly the conditions and so on of the sealing performed in the sealing step and to determine the quality of sealing based on the difference present between the conditions and so on of the sealing and actually sealed object 10. Thus, the quality of sealing can be determined more accurately. In turn, the quality of adhesion can be determined more accurately.

A generation method according to the present embodiment is a generation method of generating estimation model 43a for estimating the quality of sealing of object 10 based on the intensity of the energy emitted from adhesive 27 in object 10 sealed with adhesive 27. The generation method includes acquiring the change over time in the intensity of the energy emitted from adhesive 27 based on the intensity of the energy emitted from adhesive 27 sealing object 10 at a first time point and the intensity of the energy emitted from adhesive 27 sealing object 10 at a second time point that is later than the first time point, acquiring a determination result on the quality of sealing of object 10, and generating estimation model 43a through machine learning by using, as training data, the acquired change over time in the intensity of the energy emitted from adhesive 27 and the acquired determination result on the quality of sealing of object 10.

This method makes it possible to generate estimation model 43a and to determine the quality of sealing more accurately through generated estimation model 43a. In turn, the quality of adhesion can be determined more accurately.

Variations

Figure 10:
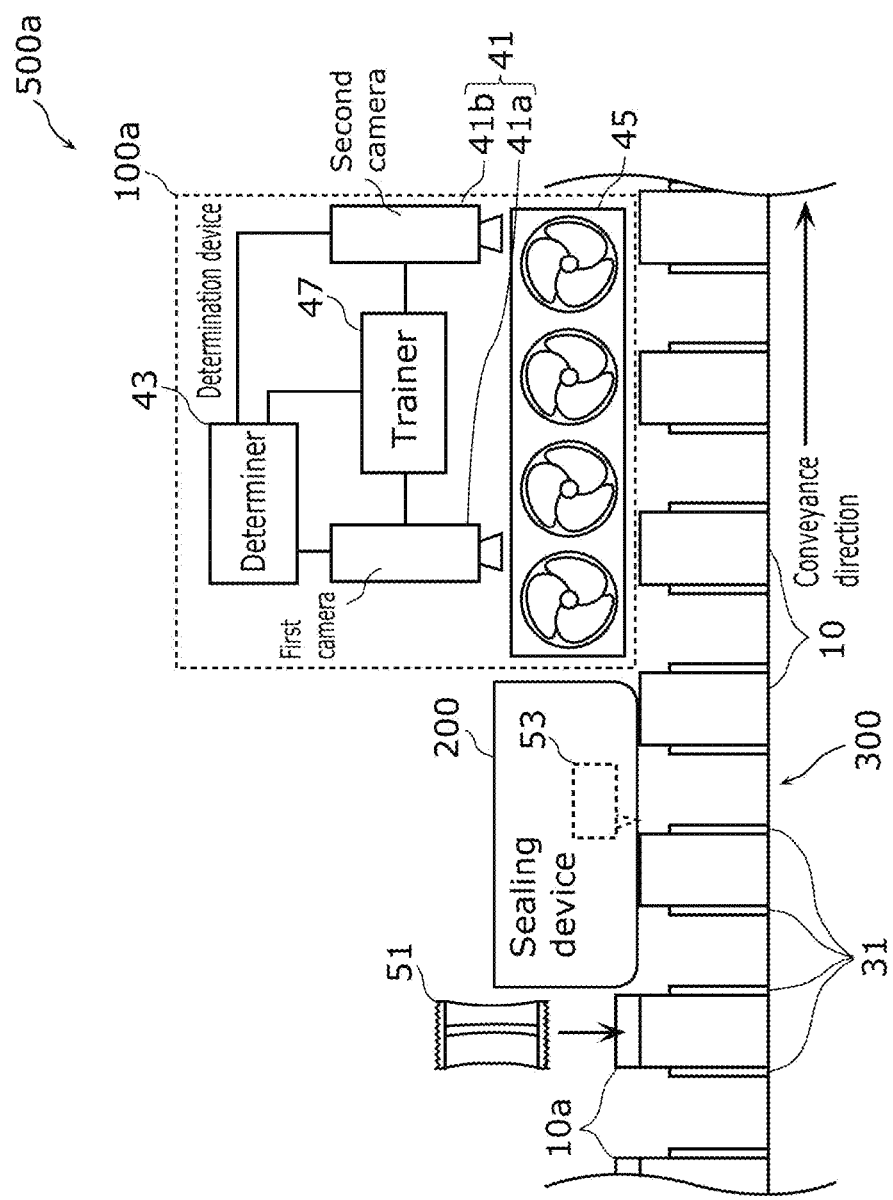
FIG. 10 is a schematic diagram for describing a configuration of a sealing system according to a variation of an embodiment.

Now, with reference to FIG. 10, some variations on the present embodiment will be described. FIG. 10 is a schematic diagram for describing a configuration of a sealing system according to a variation of the embodiment. FIG. 10 is similar to FIG. 5, and components that are common between FIGS. 5 and 10 are given identical reference characters. In the following, configurations that differ from those of the embodiment will be described, and the descriptions on the remaining configurations will be omitted or simplified.

As illustrated in FIG. 10, determination device 100a according to the present variation differs from determination device 100 according to the foregoing embodiment in that determination device 100a includes accelerator 45. Accelerator 45 is a device that forms a gradient of the intensity of the energy in order to increase the rate at which the energy is emitted from adhesive 27 used to seal object 10. Accelerator 45 is, for example, a plurality of fans disposed along conveyance path 300 as illustrated in FIG. 10. The heat energy from adhesive 27 is emitted faster as the temperature surrounding adhesive 27 is lower. This is because the difference between the temperature of adhesive 27 and the temperature of its surroundings (i.e., an energy intensity gradient) creates a thermally unstable state. Such an unstable state is likely to produce a flow of heat to achieve a stable state, and the heat energy is emitted in the direction that will result in a thermal equilibrium.

The temperature of the surroundings of adhesive 27 rises as the heat energy is emitted from adhesive 27, and the difference between the two temperatures gradually decreases. In this case, the rate at which the heat energy is emitted decreases. The plurality of fans serving as accelerator 45 recreate the temperature difference by replacing the air surrounding adhesive 27 of which the temperature has risen due to the heat energy emitted from adhesive 27 with a lower-temperature air. In this manner, accelerator 45 increases the rate at which the heat energy is emitted from adhesive 27.

In this example, instead of being implemented by the plurality of fans described above, accelerator 45 may be implemented by any other device or the like that is capable of cooling the air, and the examples include a Peltier cooling device, a circulatory water cooling device, and an air conditioning device. Herein, the present invention may be implemented as sealing system 500a that includes determination device 100a according to the present variation.

As described thus far, determination device 100a according to the present variation further includes accelerator 45 that forms an energy intensity gradient for increasing the rate at which the energy is emitted from adhesive 27.

This configuration makes it possible to shorten the time scale when the change over time in the intensity of the energy emitted from adhesive 27 spans over a relatively extended time scale. This means that the quality of the sealing condition can be determined in a shorter time, and this makes it possible to apply the present invention even to adhesive 27 that exhibits the change over time spanning over a relatively extended time scale as described above. Therefore, the applicable range (applicable instances) of determination device 100a can be increased.

Other Embodiments

Thus far, the determination device and so on according to the present invention have been described based on the foregoing embodiment and so on, but the present invention is not limited to the foregoing embodiment. For example, an embodiment obtained by making various modifications that a person skilled in the art can conceive of to the foregoing embodiment and so on and an embodiment performed by combining, as desired, the constituent elements and the functions according to the embodiment and so on within the scope that does not depart from the spirit of the present invention are also encompassed by the present invention.

In the foregoing embodiment and so on, the adhesive is applied to one of the adhesion parts of the material to be sealed while the adhesive is molten by heat. Alternatively, the adhesive may be applied while the adhesive is molten by ultrasonic vibrations. The heat produced through molecular friction caused by ultrasonic vibrations is gradually emitted, and the adhesive is thus cooled in a similar manner as in the case of the adhesive molten by heat. Similar tendencies are observed in both cooling patterns, and thus a determination device and so on having a similar configuration can be employed.

Moreover, the present invention may be applied to an object formed through a bonding method other than the "adhesive bonding" method. For example, in a case where material to be sealed 10a is made of a material such as a thermoplastic resin that can be bonded directly, instead of the "adhesive bonding" where an adhesive is used as described in the foregoing embodiment, "ultrasonic bonding" also known as "ultrasonic sealing" performed through ultrasonic vibrations can be used as a method of sealing material to be sealed 10a. Even in such a case, the present invention makes it possible to determine the quality of adhesion more accurately.

In other words, for any object formed through ultrasonic bonding, an object having a sealing part can be formed as follows. Specifically, a predetermined part of material to be sealed 10a is brought into contact with another part corresponding to that predetermined part at the location on material to be sealed 10a where material to be sealed 10a is to be sealed, and ultrasonic vibrations and pressure are applied to that located to be sealed so as to produce heat therein. Thus, material to be sealed 10a itself is molten by the produced heat energy. Then, material to be sealed 10a is allowed to harden by emitting the heat energy through natural cooling or the like. Accordingly, a similar tendency can be observed even when the heat energy associated with the heat applied to melt the adhesive in the foregoing embodiment is replaced with the heat energy resulting from the heat produced in ultrasonic bonding. It is to be noted that it has already been confirmed that similar advantageous effects can be obtained even in an object bonded through ultrasonic bonding by making the quality determination by use of the determination device and so on having a similar configuration. Therefore, the quality of bonding of an object bonded through ultrasonic bonding may be determined by use of the determination device and so on having a similar configuration.

Moreover, as described above, when it is said that the "quality" of sealing is determined in the present invention, this does not mean only to determine directly whether a given object is a "good product" (i.e., an object determined to be good) as well as whether a given object is a "defective product" (i.e., an object determined to be defective) and to make a selection. For example, when it is said that the "quality" of sealing is determined, this may include the following two cases. Specifically, in one of the cases, only the data on the change over time in the energy observed when a given object is determined to be a "good product" is used as training data in generating an estimation model, and thus the estimation model generated as a result makes the quality determination by directly performing an operation for determining a given object to be a "good product" without directly making any determination as to whether a given object is a "defective product". In the other case, conversely, only the data on the change over time in the energy observed when a given object is determined to be a "defective product" is used as training data in generating an estimation model, and thus the estimation model generated as a result makes the quality determination by directly performing an operation for determining a given object to be a "defective product" without directly making any determination as to whether a given object is a "good product". These cases may be selected and used as appropriate in accordance with the conditions, such as the accuracy, the yield rate, or the cost, required in the quality determination.

Moreover, in the configuration described in the foregoing embodiment, for an object having a sealing part sealed through bonding, the change over time in the intensity of the energy emitted from the sealing part is calculated based on the first distribution indicating the distribution of the intensity of the emitted energy acquired from an image captured by the imager at the first time point and the second distribution indicating the distribution of the intensity of the emitted energy acquired from an image captured by the imager at the second time point that is later than the first time point, and at least one of whether the sealing is good or whether the sealing is defective is determined based on the calculated change over time.

For example, with regard to the first time point and the second time point, there may be a plurality of sets of the first time point and the second time point. Specifically, four distributions acquired at respective time points including the first time point and the second time point in a first set and the first time point and the second time point in a second set may be used. This, in other words, corresponds to a case where four thermal images, such as those described with reference to FIG. 6 in the foregoing embodiment, are acquired and a curve representing the intensity of the energy is drawn accordingly.

Figure 11:
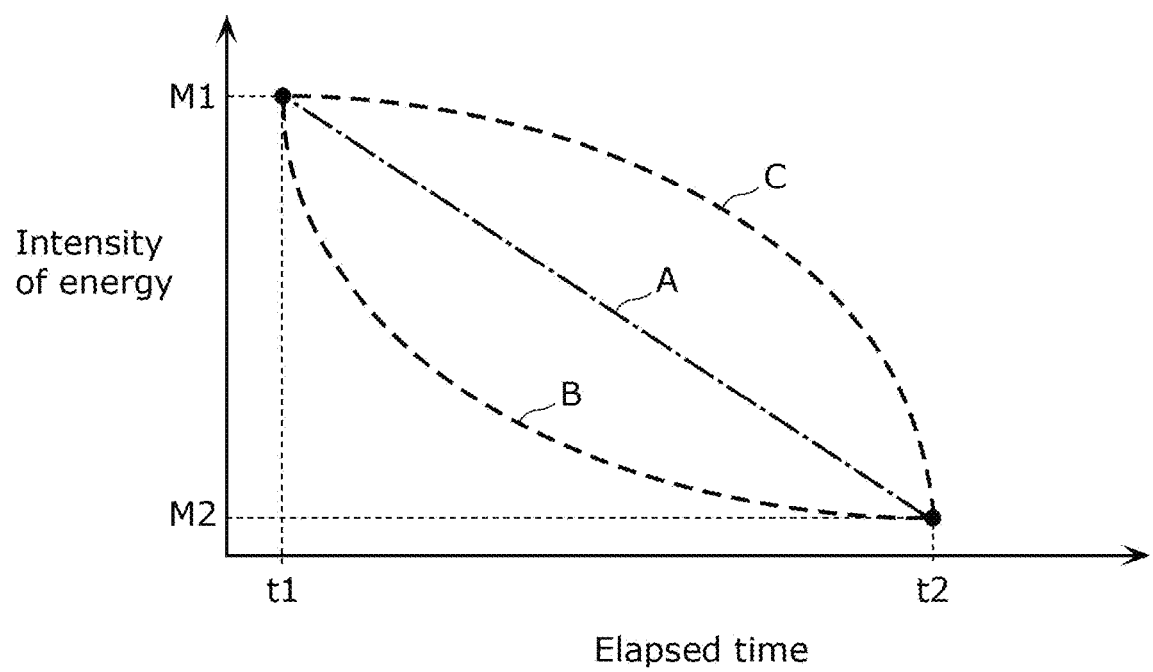
FIG. 11 is a diagram illustrating an example of a change over time in the intensity of energy acquired in an embodiment.
Figure 12:
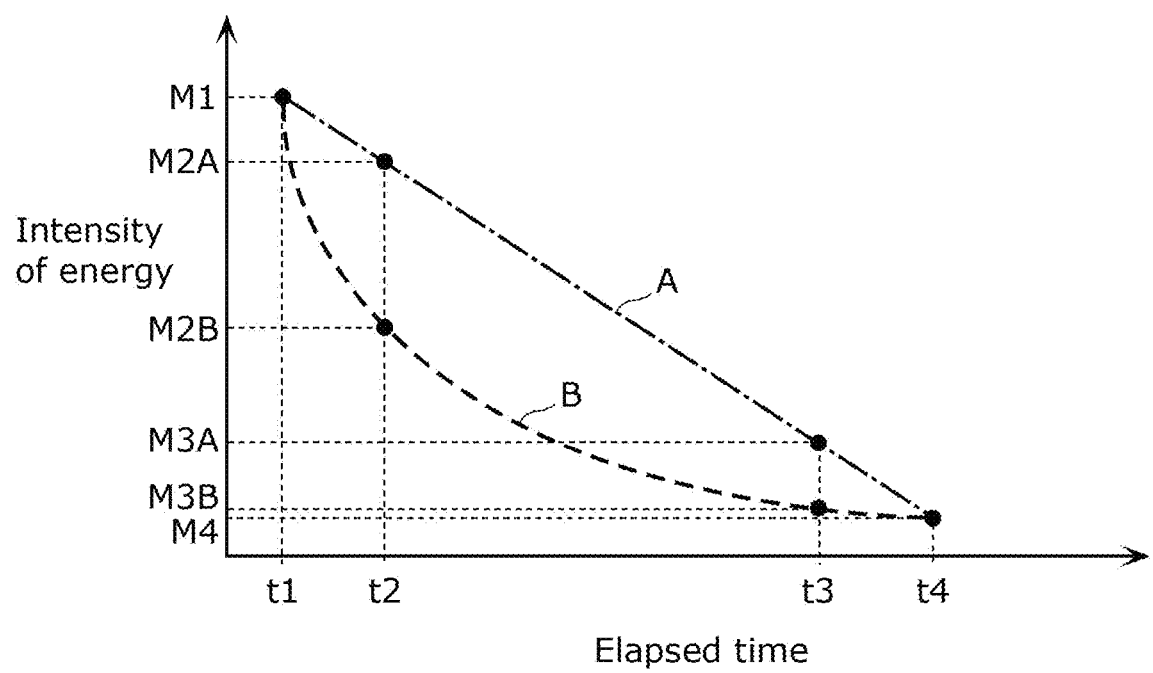
FIG. 12 is an illustration for describing an example in which a plurality of sets of a first time point and a second time point are used according to an embodiment.
Figure 13:
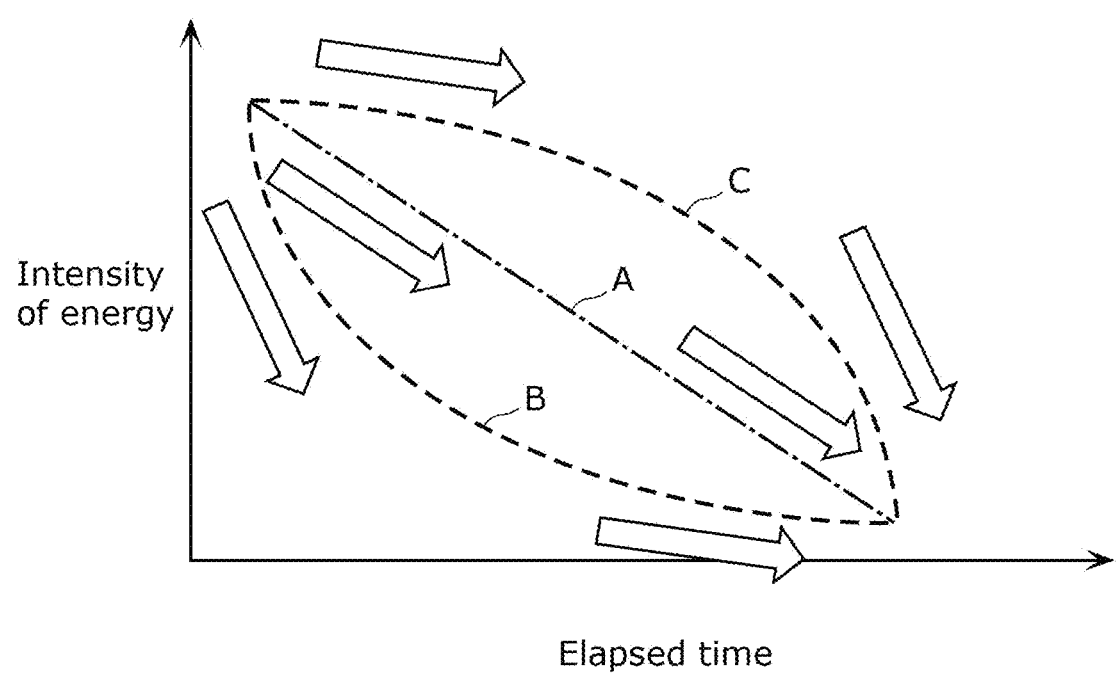
FIG. 13 is an illustration for describing an example in which a plurality of changes over time are used according to an embodiment.

Hereinafter, the description is given with reference to FIGS. 11 to 13. FIG. 11 is a schematic diagram illustrating an example of a change over time in the intensity of the energy acquired in an embodiment. FIG. 12 is an illustration for describing an example in which a plurality of sets of the first time point and the second time point are used according to an embodiment. FIG. 13 is an illustration for describing an example in which a plurality of changes over time are used according to an embodiment.

As illustrated in FIG. 11, when the change over time in the energy intensity is calculated based only on the two points including the first time point (t1 in FIG. 11) and the second time point (t2 in FIG. 11), the energy intensity to be calculated is calculated as the amount of change in the energy expressed by M1-M2. Therefore, when the change over time in the energy intensity is calculated based on these two time points, straight line A, curved line B, and curved line C in FIG. 11 cannot be distinguished from each other. Accordingly, when the change over time in the energy intensity is calculated based on four time points, the change over time in the energy intensity between the two outer ones of the four time points is represented by a straight line similar to straight line A. In contrast, it is possible to identify to which one of straight line A, curved line B, and curved line C the change over time in the energy intensity corresponds based on whether the energy intensity at a middle of the four time points is higher than the energy intensity represented by the straight line or lower than the energy intensity represented by the straight line. Calculating the energy intensity at a plurality of different sets of the first time point and the second time point in this manner makes it possible to further increase the accuracy in determining the condition of sealing.

This method is also effective when the change over time in the energy intensity is calculated based on three time points. Specifically, the second time point in the first set and the first time point in the second set may be the same time point, and the change over time in the energy intensity may be calculated based on the three time points including the stated time point, the first time point in the first set, and the second time point in the second set. The combinations of the first time point and the second time point are not limited to the two sets described above, and there may be three or more sets of the first time point and the second time point.

For example, as described above, for an object having a sealing part sealed through bonding, by use of a plurality of different sets of the first time point and the second time point, a first change over time in the intensity of the energy emitted from the sealing part may be calculated based on the first distribution indicating the distribution of the intensity of the emitted energy acquired from an image captured by the imager at the first time point in the first set and the second distribution indicating the distribution of the intensity of the emitted energy acquired from an image captured by the imager at the second time point in the first set that is later than the first time point, a second change over time in the intensity of the energy emitted from the sealing part may be calculated in a similar manner based on a third distribution indicating the distribution of the intensity of the emitted energy acquired from an image captured by the imager at the first time point in the second set (also referred to below as a third time point) and a fourth distribution indicating the distribution of the intensity of the emitted energy acquired from an image captured by the imager at the second time point in the second set (also referred to below as a fourth time point), and at least one of whether the sealing is good or whether the sealing is defective may be determined based on the first change over time and the second change over time.

For example, as illustrated in FIG. 12, the change in the energy intensity between the first time point (t1 in FIG. 12) and the second time point (t2 in FIG. 12) is expressed by M1-M2A in the case of straight line A or by M1-M2B in the case of curved line B. The amount of change in M1-M2B is greater than the amount of change in M1-M2A. Moreover, the change in the energy intensity between the third time point (t3 in FIG. 12) and the fourth time point (t4 in FIG. 12) is expressed by M3A-M4 in the case of straight line A or by M3B-M4 in the case of curved line B. The amount of change in M3B-M4 is smaller than the amount of change in M3A-M4. This makes it possible to make an inference that curved line B is a curved line projecting in a downward direction where the amount of change is not constant, where the change is large in the first half, and where the change becomes smaller in the second half. In other words, the above makes it possible to calculate the change over time in the intensity of the energy in further detail and to further increase the accuracy in determining the sealing condition.

Furthermore, as described with reference to FIG. 12, the use of the first change over time and the second change over time in the energy intensity makes it possible to find out the phases of energy emission in detail. For example, as illustrated in FIG. 13, the energy is emitted at constant phase in straight line A, and thus it can be seen that the relationship between heat emission and heat retention is constant in every period delimited by any given two time points. Meanwhile, curved line B shows a change in the vertical axis direction where the heat emission is dominant in the first half and then shows a change in the horizontal axis direction where the heat retention is dominant in the second half. In a similar manner, curved line C shows a change in the horizontal axis direction where the heat retention is dominant in the first half and then shows a change in the vertical axis direction where the heat emission is dominant in the second half.

For example, the shift from the heat retention phase to the heat emission phase as seen in curved line C may conceivably occur when the sealing part has come into contact with an item having a large heat capacity while the time elapses. In this manner, a more detailed determination on the sealing condition may be made based on the first change over time and the second change over time. As it is clear from the foregoing description, a larger number of sets of the first time point and the second time point for capturing the distribution of the intensity of the energy leads to an increased accuracy in the determination but has a trade-off in that it requires a higher processing performance. Therefore, how many sets are to be used may be determined, as appropriate, in accordance with the required accuracy, the relationship to the processing speed, and so on.

In one example described in the foregoing embodiment and so on, at least one of whether the sealing is good or whether the sealing is defective is determined based on the change over time in the intensity of the energy observed while the intensity of the energy decreases as the heat energy is emitted from the sealing part (e.g., the adhesive or the like) of the object, but this is merely an example. With regard to the change over time in the intensity of the energy according to the present invention, it is needless to say that a case is also included where at least one of whether the sealing is good or whether the sealing is defective is determined based on the change over time in the intensity of the energy observed not only when the intensity of the energy decreases as in the foregoing example but also when the intensity of the energy increases.

For example, in the case of the adhesive bonding in which the molten adhesive applied to the adhesion parts hardens to bond the adhesion parts, the intensity of the energy emitted from the object shows a temporarily rising trend. This occurs because the heat energy in the molten adhesive and the heat energy that arises as a by-product in the hardening reaction are emitted. With regard to the emitted energy, the decrease in the heat energy in the molten adhesive becomes dominant after the time point when the decrease in the heat energy in the molten adhesive and the increase in the heat energy produced in the hardening reaction reach an apparent equilibrium. Therefore, the intensity of the energy emitted from such an object shows a temporarily rising trend, and then the intensity of the emitted energy decreases with a further decrease in the emitted energy due to the heat capacity or the like at the adhesion parts or the like of the object.

The change over time in the intensity of the energy emitted in the period in which the intensity of the emitted energy temporarily rises is steeper than the change over time in the intensity of the energy observed when the intensity of the energy decreases. In other words, the present inventor has found that the use of the change over time in the intensity of the energy in the period in which the intensity of the emitted energy temporarily rises makes it possible to determine at least one of whether the sealing is good or whether the sealing is defective more quickly and more accurately.

For example, the present invention can be implemented not only in the form of hardware, such as the determination device, but also in the form of a program that includes, as steps, the processes performed by the constituent elements of the determination device and so on and also in the form of a computer readable recording medium having such a program recorded thereon. The program may be prerecorded in a recording medium or supplied to a recording medium via a broadband communication network including the internet.

In other words, the general or specific embodiments described above may be implemented in the form of a system, a device, an integrated circuit, a computer program, or a computer readable recording medium, or implemented through any desired combination of a system, a device, an integrated circuit, a computer program, and a recording medium.

INDUSTRIAL APPLICABILITY

The determination device and so on according to the present invention are used, for example but not limited to, to determine the quality of bonding more accurately.

REFERENCE SIGNS LIST 10 object
10a material to be sealed
21 side flap
23 inner lid flap
25 outer lid flap
27 adhesive
31 holder
41 imager
41a first camera
41b second camera 43 determiner
43a estimation model
45 accelerator
47 trainer
47a first acquirer
47b second acquirer
47c generator
51 contents
53 dispenser
100, 100a determination device
200 sealing device
300 conveyance path
500, 500a sealing system

The invention claimed is:

1. A determination device, comprising:
an imager that
captures an image of an object subjected to a sealing process through bonding, and
acquires a distribution of an intensity of energy emitted from a sealing part formed as a result of the sealing process; and
a determiner that
calculates a change over time in the intensity of the energy emitted from the sealing part based on a first distribution and a second distribution, the first distribution indicating the distribution acquired from an image captured by the imager at a first time point, the second distribution indicating the distribution acquired from an image captured by the imager at a second time point that is later than the first time point, and
determines at least one of whether sealing is good or whether the sealing is defective based on the change over time calculated.

2. The determination device according to claim 1, wherein
the bonding is ultrasonic bonding performed as the sealing part molten by ultrasonic vibrations hardens to be bonded, and
the imager acquires the distribution of the intensity of the energy emitted when the sealing part hardens.

3. The determination device according to claim 1, wherein
the bonding is adhesive bonding performed as an adhesive applied in a molten state to adhesion parts hardens to bond the adhesion parts, and
the imager acquires the distribution of the intensity of the energy emitted when the adhesive applied hardens.

4. The determination device according to claim 3, wherein
the adhesive bonding in the sealing part is performed by an adhesive, the adhesive being applied to adhesion parts of a material to be sealed while the adhesive is molten by heat, the material being the object that has not been sealed, hardening as the adhesive emits heat energy as the energy emitted, and gluing together the adhesion parts of the material to be sealed, and
the imager acquires a distribution of an intensity of the heat energy emitted from the adhesive used for the adhesive bonding in the sealing part.

5. The determination device according to claim 1, wherein the imager includes:
a first camera that acquires the first distribution; and
a second camera that acquires the second distribution, the second camera being different from the first camera.

6. The determination device according to claim 1, further comprising:

an accelerator that forms an energy intensity gradient for increasing an emission rate at which the energy is emitted from the sealing part.

7. The determination device according to claim 1, wherein the determiner determines that the sealing of the object is defective when a rate of the change over time calculated based on the first distribution and the second distribution is lower than a predetermined rate.

8. The determination device according to claim 1, wherein the determiner
includes an estimation model for estimating at least one of whether the sealing of the object is good or whether the sealing of the object is defective based on the change over time, and
determines, via the estimation model, at least one of whether the sealing is good or whether the sealing is defective.

9. The determination device according to claim 8, further comprising:
a trainer that trains the estimation model through machine learning by using, as training data, the change over time and a result of determination as to at least one of whether the sealing of the object is good or whether the sealing of the object is defective.

10. The determination device according to claim 1, wherein
the determiner calculates the change over time based on each of a plurality of different sets of the first time point and the second time point.

11. A sealing system, comprising:
a sealing device that forms an object by sealing a material to be sealed through bonding; and
the determination device according to claim 1.

12. A determination device, comprising:
an imager that
captures an image of an object subjected to a sealing process through adhesive bonding by use of an adhesive, and
acquires a distribution of an intensity of energy emitted from the adhesive in a sealing part formed as a result of the sealing process; and
a determiner that
calculates a change over time in the intensity of the energy emitted from the adhesive based on a first distribution and a second distribution, the first distribution indicating the distribution acquired from an image captured by the imager at a first time point, the second distribution indicating the distribution acquired from an image captured by the imager at a second time point that is later than the first time point, and
determines at least one of whether sealing is good or whether the sealing is defective based on the change over time calculated.

13. A non-transitory computer readable recording medium having an estimation model recorded thereon, the estimation model being included in a program to be executed by a computer and outputting output data estimated based on input data received, wherein
in response to receiving, as the input data, a change over time in an intensity of energy emitted from a sealing part of an object subjected to a sealing process through bonding, the estimation model estimates at least one of whether sealing of the object is good or whether the sealing of the object is defective and outputs an estimation result as the output data, the change over time being calculated based on an intensity of energy emitted at each of a first time point and a second time point that is later than the first time point.

14. A generation device that generates an estimation model for estimating at least one of whether sealing of an object is good or whether the sealing of the object is defective based on an intensity of energy emitted from a sealing part of the object subjected to a sealing process through bonding, the generation device comprising:
- a first acquirer that acquires a change over time in the intensity of the energy emitted from the sealing part based on the intensity of the energy emitted from the sealing part at each of a first time point and a second time point that is later than the first time point;
- a second acquirer that acquires a result of determination as to at least one of whether the sealing of the object is good or whether the sealing of the object is defective; and
- a generator that generates the estimation model through machine learning by using, as training data, the change over time acquired by the first acquirer and the determination result acquired by the second acquirer.

15. A determination method, comprising:
- capturing an image of an object subjected to a sealing process through bonding, and acquiring a distribution of an intensity of energy emitted from a sealing part;
- calculating a change over time in the intensity of the energy emitted from the sealing part based on a first distribution and a second distribution, the first distribution indicating the distribution acquired from an image captured at a first time point in the capturing, the second distribution indicating the distribution acquired from an image captured at a second time point that is later than the first time point in the capturing; and
- determining at least one of whether sealing of the object is good or whether the sealing of the object is defective based on the change over time calculated.

16. A generation method of generating an estimation model for estimating at least one of whether sealing of an object is good or whether the sealing of the object is defective based on an intensity of energy emitted from a sealing part of the object subjected to a sealing process through bonding, the generation method comprising:
- acquiring a change over time in the intensity of the energy emitted from the sealing part, the change over time being calculated based on the intensity of the energy emitted from the sealing part at each of a first time point and a second time point that is later than the first time point;
- acquiring a result of determination as to at least one of whether the sealing of the object is good or whether the sealing of the object is defective; and
- generating the estimation model through machine learning by using, as training data, the change over time acquired in the intensity of the energy emitted from the sealing part and the determination result acquired as to at least one of whether the sealing of the object is good or whether the sealing of the object is defective.

* * * * *